(12) United States Patent
Wang et al.

(10) Patent No.: US 12,388,896 B2
(45) Date of Patent: Aug. 12, 2025

(54) METHOD AND SYSTEM FOR COMPUTING POWER NETWORK SCHEDULING SERVICE BASED ON COMPREHENSIVE WEIGHT DECISION OF NETWORK PERFORMANCE

(71) Applicants: SHANDONG COMPUTER SCIENCE CENTER (NATIONAL SUPERCOMPUTER CENTER IN JINAN), Shandong (CN); QILU UNIVERSITY OF TECHNOLOGY (SHANDONG ACADEMY OF SCIENCES), Shandong (CN)

(72) Inventors: Yinglong Wang, Jinan (CN); Jing Chen, Jinan (CN); Meihong Yang, Jinan (CN); Ying Guo, Jinan (CN); Xiaoming Wu, Jinan (CN); Jing Ge, Jinan (CN); Na Li, Jinan (CN)

(73) Assignees: SHANDONG COMPUTER SCIENCE CENTER (NATIONAL SUPERCOMPUTER CENTER IN JINAN), Jinan (CN); QILU UNIVERSITY OF TECHNOLOGY (SHANDONG ACADEMY OF SCIENCES), Jinan (CN)

( * ) Notice: Subject to any disclaimer, the term of this patent is extended or adjusted under 35 U.S.C. 154(b) by 0 days.

(21) Appl. No.: 19/032,038

(22) Filed: Jan. 18, 2025

(65) Prior Publication Data
US 2025/0168230 A1    May 22, 2025

Related U.S. Application Data

(63) Continuation-in-part of application No. PCT/CN2024/106951, filed on Jul. 23, 2024.

(30) Foreign Application Priority Data

Aug. 3, 2023  (CN) .......................... 202310967433.3

(51) Int. Cl.
H04L 67/1097    (2022.01)
H04L 67/101     (2022.01)
H04L 67/1012    (2022.01)

(52) U.S. Cl.
CPC ........ H04L 67/1097 (2013.01); H04L 67/101 (2013.01); H04L 67/1012 (2013.01)

(58) Field of Classification Search
CPC ......................... H04L 67/1097; H04L 67/101; H04L 67/1012
See application file for complete search history.

(56) References Cited

U.S. PATENT DOCUMENTS 9,860,303  B1 *  1/2018  Vicaire ............... H04L 67/1012
2009/0288084 A1 * 11/2009 Astete ................... G06Q 30/02
                                                                  718/1

(Continued)

FOREIGN PATENT DOCUMENTS

CN         102781072 A     11/2012
CN         112132447 A     12/2020
(Continued)

OTHER PUBLICATIONS

Deeptaanshu Kumar et al., Separating Storage and Compute with the Databricks Lakehouse Platform, 2022 IEEE 9th International Conference on Data Science and Advanced Analytics, 2022, 2 pages.

(Continued)

*Primary Examiner* — Shean Tokuta
(74) *Attorney, Agent, or Firm* — Porus IP LLC

(57) ABSTRACT

Method for computing power network scheduling service based on comprehensive weight decision of network performance and the system thereof are provided. A computing power network service platform combines the filtered storage platforms and at least one filtered computing power platform that do not belong to a same data center to obtain (Continued)

a plurality of combinations; constructs a multi-objective optimization function under a storage-computing separation scenario based on the different network performance indicators, subjective weight vectors of the different network performance indicators, objective weight vectors of the different network performance indicators between the storage platforms and the computing power platforms for each combination, and resource demand of the user, and solves the multi-objective optimization function to obtain the optimal combination of the storage platform and the computing power platform that meets an user demand; and deploys job and computational data of the user to the optimal combination for storage and computation.

6 Claims, 5 Drawing Sheets

(56) References Cited

U.S. PATENT DOCUMENTS

| | | | | |
|---|---|---|---|---|
| 2012/0263191 | A1* | 10/2012 | Baron | H04L 67/1097 370/462 |
| 2012/0272237 | A1* | 10/2012 | Baron | G06F 9/5077 718/1 |
| 2017/0272541 | A1* | 9/2017 | Kreps | H04L 12/66 |
| 2025/0168230 | A1* | 5/2025 | Wang | H04L 67/1012 |

FOREIGN PATENT DOCUMENTS

| | | | | |
|---|---|---|---|---|
| CN | 114399309 | A | | 4/2022 |
| CN | 115168061 | A | | 10/2022 |
| CN | 115328663 | A | | 11/2022 |
| CN | 115729704 | A | | 3/2023 |
| CN | 115757064 | A | | 3/2023 |
| CN | 116208567 | A | | 6/2023 |
| CN | 116361006 | A | | 6/2023 |
| CN | 116501711 | A | | 7/2023 |
| CN | 116708446 | A | * | 9/2023 ......... H04L 67/1012 |
| CN | 117596246 | A | * | 2/2024 .......... H04L 67/101 |
| WO | WO-2021068585 | A1 | * | 4/2021 .......... G06F 9/5005 |
| WO | 2022095620 | A1 | | 5/2022 |
| WO | 2023125493 | A1 | | 7/2023 |

OTHER PUBLICATIONS

First Office Action in Chinese Application No. 202310967433.3 mailed on Sep. 11, 2023, 15 pages.

Decision to Grant a Patent in Chinese Application No. 202310967433.3 mailed on Sep. 26, 2023, 11 pages.

Sun, Yukun et al., Study on Intelligent Computing Aware Route Allocation Policy in Edge Computing-Aware Networks, Radio Communications Technology, 48(1): 60-67, 2022.

International Search Report in PCT/CN2024/106951 mailed on Oct. 22, 2024, 7 pages.

* cited by examiner

METHOD AND SYSTEM FOR COMPUTING POWER NETWORK SCHEDULING SERVICE BASED ON COMPREHENSIVE WEIGHT DECISION OF NETWORK PERFORMANCE

CROSS-REFERENCE TO RELATED APPLICATIONS

This application is a continuation-in-part application of International Application No. PCT/CN2024/106951, filed on Jul. 23, 2024, which claims priority to Chinese Patent Application No. 202310967433.3, filed on Aug. 3, 2023, the entire contents of each of which are incorporated herein by reference.

TECHNICAL FIELD

The present disclosure relates to the technical field of computing resource scheduling, and in particular, to a method for computing power network scheduling service based on comprehensive weight decision of network performance and the system thereof.

BACKGROUND

In the current digitization era, the demand for computation and data processing in various industries continues to grow, with increasing requirements for computing power and storage capacity. With the dramatic increase of the data amount in the fields of scientific research, industrial production, and social livelihoods, the number of tasks, such as large-scale numerical computation, big data analysis, and artificial intelligence data mining, has also increased dramatically. The diversity of computing scenarios puts forward diversified demands for computing power, storage, and network resources, and there is a growing demand for computing power capacity and quantity. However, traditional single computing power platforms are often difficult to meet the demands of complex applications, and there is an urgent need to build a computing power network that realizes the convergence and coordinated utilization of computing power platforms around the world. Especially for large-scale tasks such as large model training and scientific computing, they require support of big data, strong algorithms, and high computing, and in the face of trillions of training parameters, the collaborative computation of multiple computing power platforms is imperative.

However, existing methods for collaborative scheduling of wide-area resources have some limitations when facing complex and changing network environments and task requirements. These methods usually use static policies or simple rules for task allocation, ignoring the variability of network paths and heterogeneity of resources, and thus cannot be fully adapted to real-world situations. This simple task assignment policy can result in tasks being assigned to network paths with poor performance or resources, which reduces efficiency and performance of system. For example, if a computing power platform is located at an edge position of the network topology or a network bottleneck node, task allocation based on simple rules can result in the task experiencing high delay or bandwidth bottlenecks during network transmission, affecting completion time and quality of task.

Therefore, there is a need to provide a method and a system for computing power network scheduling service based on comprehensive weight decision of network performance to improve computational resource utilization and task scheduling efficiency.

SUMMARY

One or more embodiments of the present disclosure provide a method for computing power network scheduling service based on comprehensive weight decision of network performance. The method comprises: filtering out, by a computing power network service platform, a plurality of storage platforms meeting a storage demand of a user based on the storage demand; wherein data centers corresponding to the plurality of storage platforms meeting the storage demand are called a target group data center; determining, by the computing power network service platform, whether the target group data center has at least one computing power platform meeting a computing power demand of the user, in response to a determination that the target group data center has the at least one computing power platform meeting the computing power demand, outputting number of data center corresponding to the at least one computing power platform; or in response to a determination that the target group data center does not have the at least one computing power platform meeting the computing power demand, filtering out at least one computing power platform meeting the computing power demand from a non-target group data center based on the computing power demand; combining, by the computing power network service platform, the filtered storage platforms and at least one filtered computing power platform that do not belong to a same data center one by one to obtain a plurality of combinations of the storage platforms and the computing power platforms; and calculating numerical values of different network performance indicators between the storage platforms and the computing power platforms for each combination of the plurality of combinations; determining, by the computing power network service platform, an optimal combination of a storage platform and a computing power platform based on the numerical values of the different network performance indicators between the storage platforms and the computing power platforms for each combination of the plurality of combinations; and deploying job and computational data of the user to the optimal combination of the storage platform and the computing power platform for storage and computation.

One or more embodiments of the present disclosure further provide a system for computing power network scheduling service based on comprehensive weight decision of network performance. The system comprises: a computing power network service platform, wherein the computing power network service platform is connected to a user, and the computing power network service platform is further connected to a plurality of data centers, wherein each of the data centers comprises a computing power platform and a storage platform. The computing power network service platform is configured to filter out a plurality of storage platforms meeting a storage demand of a user based on the storage demand; wherein data centers corresponding to the plurality of storage platforms meeting the storage demand are called a target group data center; determine whether the target group data center has at least one computing power platform meeting a computing power demand of the user, in response to a determination that the target group data center has the at least one computing power platform meeting the computing power demand, output number of data center corresponding to the at least one computing power platform;

or in response to a determination that the target group data center does not have the at least one computing power platform meeting the computing power demand, filter out at least one computing power platform meeting the computing power demand from a non-target group data center based on the computing power demand; combine the filtered storage platforms and at least one filtered computing power platform that do not belong to a same data center one by one to obtain a plurality of combinations of the storage platforms and the computing power platforms; and calculate numerical values of different network performance indicators between the storage platforms and the computing power platforms for each combination of the plurality of combinations; determine an optimal combination of a storage platform and a computing power platform based on the numerical values of the different network performance indicators between the storage platforms and the computing power platforms for each combination of the plurality of combinations; and deploy job and computational data of the user to the optimal combination of the storage platform and the computing power platform for storage and computation.

BRIEF DESCRIPTION OF THE DRAWINGS

The accompanying drawings of the present disclosure, which form part of the present disclosure, are used to provide a further understanding of the present disclosure, and the schematic embodiments of the present disclosure and their illustrations are used to explain the present disclosure, and do not constitute an undue limitation of the present disclosure.

DETAILED DESCRIPTION

Figure 1:
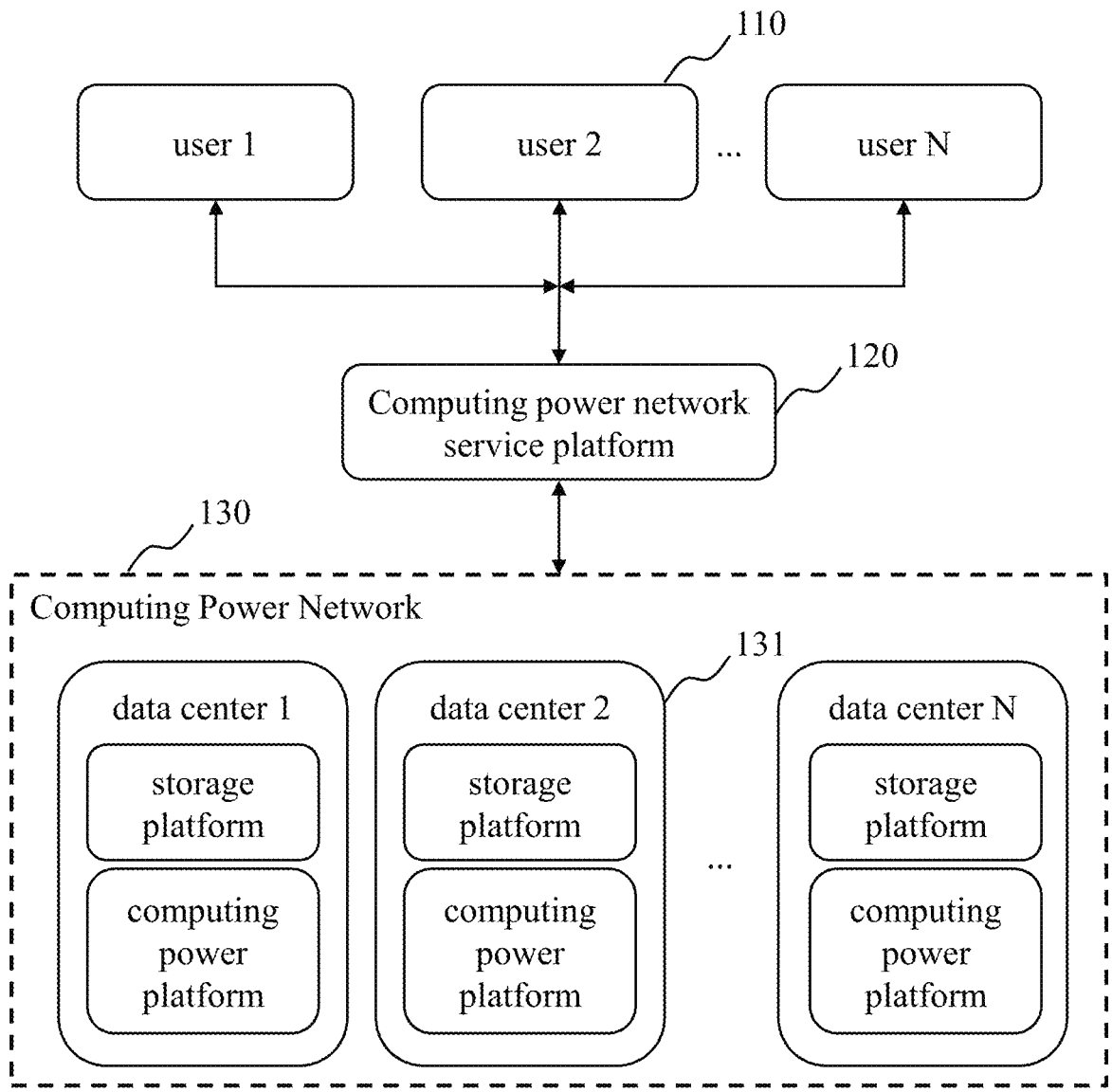
FIG. 1 is a schematic diagram illustrating an architecture of a system for computing power network scheduling service based on comprehensive weight decision for network performance according to some embodiments of the present disclosure.

It should be noted that the following detailed descriptions are all exemplary in nature and are intended to provide further illustrations of the present disclosure. Unless otherwise indicated, all technical and scientific terms used herein have the same meanings as commonly understood by those of ordinary skill in the art to which the present disclosure belongs.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" as used herein is a way to distinguish between different components, elements, parts, sections or assemblies at different levels. However, the words may be replaced by other expressions if other words accomplish the same purpose.

As shown in this disclosure and the claims, unless the context clearly suggests an exception, the words "one," "a", "an", and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

Flowcharts are used in this disclosure to illustrate operations performed by a system in accordance with embodiments of the present disclosure. It should be appreciated that the preceding or following operations are not necessarily performed in an exact sequence. Instead, steps can be processed in reverse order or simultaneously. Also, it is possible to add other operations to these processes or remove a step or steps from them.

FIG. 1 is a schematic diagram illustrating an architecture of a system for computing power network scheduling service based on comprehensive weight decision of network performance according to some embodiments of the present disclosure.

Some embodiments of the present disclosure provide a system for computing power network scheduling service based on comprehensive weight decision of network performance (hereinafter referred to as the computing power network scheduling service system). In some embodiments, the computing power network scheduling service system includes a computing power network service platform. As shown in FIG. 1, the computing power network service platform 120 interacts with the user 110, and the computing power network service platform 120 is connected to the computing power network 130 including a plurality of data centers 131, each of which includes a computing power platform and a storage platform.

The user 110 is a usage party, which may interact with the computing power network service platform 120 for data and/or information through a communication terminal. For example, the communication terminal may include, but is not limited to, a device such as a cell phone, a computer, a tablet, or the like.

In some embodiments, the user 110 may upload one or more resource demands. For more description of resource demands, please see FIG. 2 and related descriptions.

In some embodiments, the user 110 may upload job and computational data. The job and computational data need to be computed by the user via the computing power network service platform 120. For example, the job and computational data may include, but is not limited to, production data of an enterprise, operational data of the enterprise, assembly line operation data of the enterprise, or the like.

Understandably, if own resources of the enterprise do not have big data analysis capabilities, it may need to analyze the data through a cloud computing power platform (e.g., the computing power network service platform). Cloud computing power platforms need to take into account the resource demands of the user and the computation amount and carry out a reasonable allocation of computational power and data storage.

In some embodiments, the data sources are different, the geographic locations are different, and the user demands are different, then the combination of the computing power platform and the storage platform ultimately generated by the computing power network service platform is different.

The computing power network service platform 120 is a new type of information infrastructure, the core idea of which is to connect geographically distributed data center nodes and dynamically and real-time sense the state of the computational resources, and then coordinate the allocation and scheduling of computational tasks, and transmit data, thereby constituting a network that senses, allocates, and schedules computational power on a global scale. In some embodiments, the computing power network service platform 120 may include a database, a global scheduling system, and a job execution system.

In some embodiments, the database is configured to store key data such as user, resource, and job information. The global scheduling system is mainly configured to provide offloading policies for the tasks and computational data, and to compute an optimal storage platform and an optimal computing power platform. The job execution system is mainly configured to execute tasks based on the optimal storage platform and the optimal computing power platform computed by the global scheduling system.

In some embodiments, the computing power network service platform 120 may receive a resource demand uploaded by a user, determine whether the user has a sufficient quota, in response to a determination that the user has sufficient quota, proceed to a next step; or in response to a determination that the user does not have sufficient quota, return insufficient user quota information.

In some embodiments, the computing power network service platform 120 may also filter out a plurality of storage platforms that meet the storage demand based on the storage demand of the user 110. The data centers 131 corresponding to the plurality of storage platforms that meet the storage demand are referred to as a target group data center.

In some embodiments, the service platform 120 may also determine whether the target group data center has at least one computing power platform meeting a computing power demand of the user 110, in response to a determination that the target group data center has the at least one computing power platform meeting the computing power demand, output number of the data center corresponding to the at least one computing power platform; or in response to a determination that the target group data center does not have the at least one computing power platform meeting the computing power demand, filter out at least one computing power platform meeting the computing power demand from a non-target group data center based on the computing power demand.

In some embodiments, the computing power network service platform 120 may also combine the filtered storage platforms and at least one filtered computing power platform that do not belong to a same data center 131 one by one to obtain a plurality of combinations of the storage platforms and the computing power platforms; and calculate numerical values of different network performance indicators between the storage platforms and the computing power platforms for each combination of the plurality of combinations.

In some embodiments, the computing power network service platform 120 may also construct a multi-objective optimization function under a storage-computing separation scenario based on the numerical values of the different network performance indicators, subjective weight vectors of the different network performance indicators, objective weight vectors of the different network performance indicators between the storage platforms and the computing power platforms for each combination, and a resource demand of the user 110, and solve the multi-objective optimization function to obtain the optimal combination of the storage platform and the computing power platform that meets an user demand.

In some embodiments, the computing power network service platform 120 may also deploy job and computational data of the user 110 to the optimal combination of the storage platform and the computing power platform for storage and computation.

The computing power network 130 refers to a network architecture based on computing resource for providing distributed computing and storage capabilities. In some embodiments, the computing power network 130 may comprise a plurality of data center nodes, which may be physical servers, virtual machines, containers, etc.

These data center nodes are connected together via a network to form a computing power network for collaborative operation to joint complete computing tasks. In some embodiments, the computing power network 130 may distribute computation and storage capacity across the data center nodes in the network to improve overall computational efficiency and processing power. The data center nodes may communicate and collaborate with each other via the network to achieve functions such as distribution of tasks, parallel computation, data exchange, and collection of results.

The data center 131 refers to a platform for analyzing, storing, and processing data. In some embodiments, the data center 131 is a cloud service center, and the data center includes a computing power platform and a storage platform.

The computing power platform is a platform configured to process data. In some embodiments, the computing power platform has abundant computing power resources, which may provide a large amount of computing power for the task computation and be mainly used for offloading task computation.

The storage platform is a platform for storing data. In some embodiments, the storage platform has rich storage resources, which may provide storage space for the user's data and be primarily responsible for the storage of computational data.

Let the data center be $D=\{D_1, D_2, \ldots, D_i\}$, where $Di=\{(S_1, C_1), (S_2, C_2), \ldots, (S_n, C_n)\}$, where $S_1, S_2, \ldots, S_n$ are storage platforms, $C_1, C_2, \ldots, C_n$ are the computing power platforms, a storage type of the storage platform is storetype, the remaining storage size of the storage platform is $storesize_{surplus}$, and the storage platform is Si, the remaining memory size of the computing power platform is $memory_{surplus}$, the remaining number of cpu is $cpu_{surplus}$, and the computing power platform is Ci.

Let unique identifier of the user be ID, memory quota of the user is $memory_{quota}$, the cpu quota is $cpu_{quota}$, unique identifier of the compute data is $ID_{data}$, the type of the storage quota of the user is $storetype_{quota}$, and the size of the storage quota of the user is $storesize_{quota}$. The size of the requested memory of the user is $memory_{request}$, the number of cpu is $cpu_{request}$; the storage type of the request of the user is $storetype_{request}$, and the size of the computational data is $storesize_{request}$.

More about the computing power network scheduling service system and its modules can be found in FIGS. 2-5 and their related descriptions.

It should be understood that the computing power network scheduling service system and its modules shown in FIG. 1 may be realized using various approaches. It should be noted that the above description of the computing power network scheduling service system based on the comprehensive weight decision of the network performance is only for the convenience of the description, and it does not limit the present disclosure to the scope of the cited embodiments. It is to be understood that for a person skilled in the art, after understanding the principle of the system, it is possible to arbitrarily combine individual modules or form a sub-system to be connected to other modules without departing from the principle. Deformations such as these are within the scope of protection of this specification.

Figure 2:
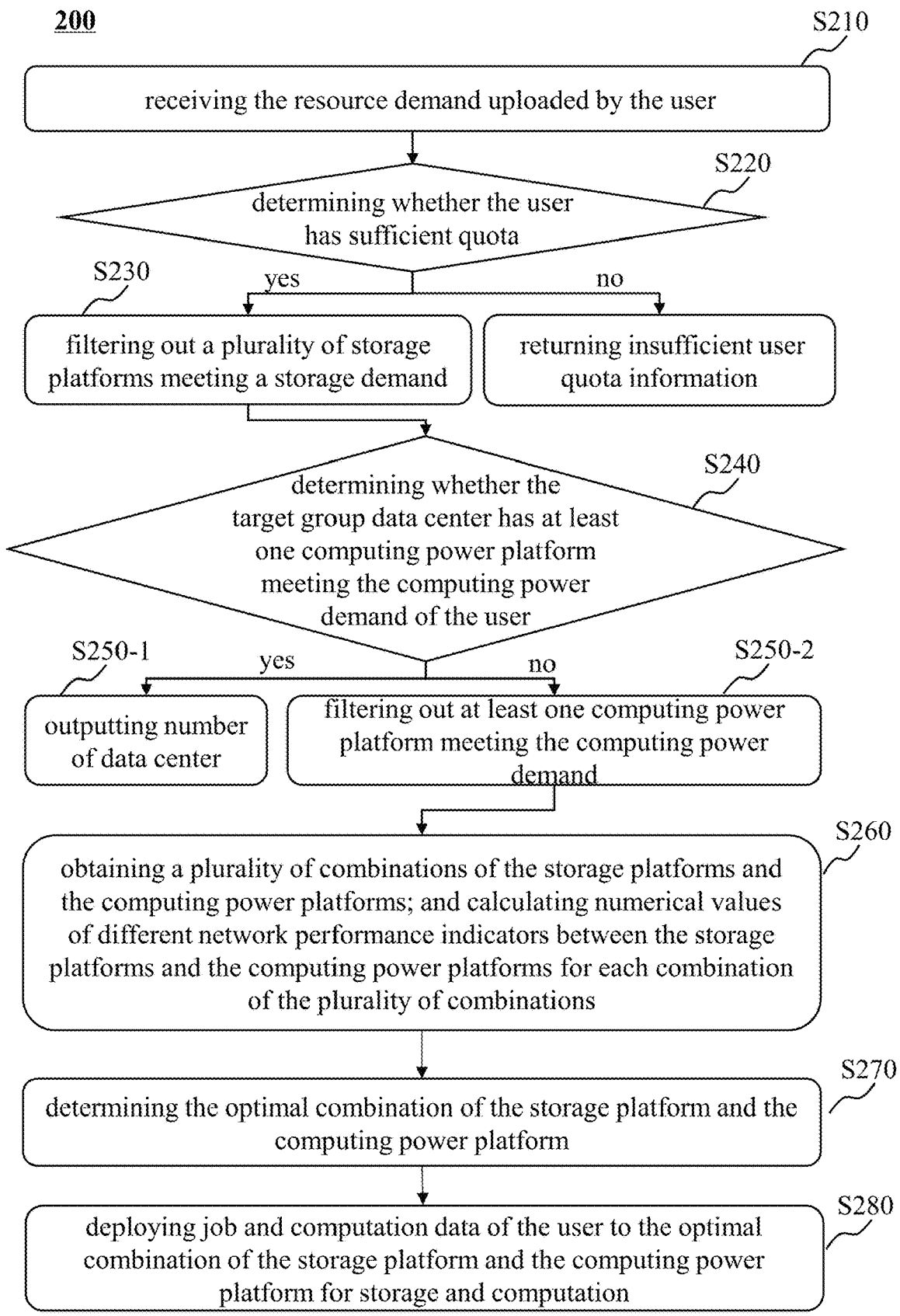
FIG. 2 is an exemplary flowchart illustrating a method for computing power network scheduling service based on comprehensive weight decision of network performance according to some embodiments of the present disclosure.

FIG. 2 is an exemplary flowchart illustrating a method for computing power network scheduling service based on comprehensive weight decision of network performance according to some embodiments of the present disclosure. As shown in FIG. 2, a process 200 may include the following steps. In some embodiments, the process 200 may be performed by a computing power network service platform.

Step S210: receiving the resource demand uploaded by the user.

The resource demand is the user's demand for a computing power network scheduling service. For example, the resource demand includes CPU memory capacity and number of cores, storage capacity, virtual machine specifications, number of virtual machines, location priority or not, network priority or not, capacity priority or not, and low price priority or not.

The location priority refers to the data center with the closest Euclidean distance to IP address of the user.

In some embodiments, the resource demand may include storage demand and computing power demand. For more description of storage demand and computing power demand, please see elsewhere in the description of FIG. 2.

In some embodiments, when network performance is the same or similar, the resource demand may be positively correlated with the data amount of the job and computational data, and the user may determine the resource demand based on the size of the data amount of the job and computational data. For example, the larger the data amount of the job and computation data, the larger the resource demand. For the description of job and computational data, please see FIG. 1 and related description.

In some embodiments, the resource demand may be uploaded by a user to the computing power network service platform.

Step S220: determining whether the user has sufficient quota; in response to a determination that the user has sufficient quota, proceeding to a next step S230; and in response to a determination that the user does not have sufficient quota, returning insufficient user quota information.

Quota is the capacity of computation and storage that the user has. For example, quota may include storage capacity (e.g., user storage quota), computing power capacity (e.g., CPU quota), etc.

Insufficient user quota refers to that the user's current quota is less than the number of current resource demand of the user. For example, if a current storage quota of the user A is 10 GB, but the user A creates 13 GB of storage space, then the user quota of the user A is insufficient.

In some embodiments, the computing power network service platform determines whether the user has sufficient quota, including: if the memory quota of the user is larger than the size of the memory requested by the user, the CPU quota of the user is larger than the number of CPUs requested by the user, the user storage quota type matches the storage quota type requested by the user, and the storage size of the user storage quota is larger than the size of the computation data requested by the user, then indicating that the user has sufficient quota, otherwise, indicating that the user does not have sufficient quota.

Exemplarily, the computing power network service platform receives the resource demand of the user ($Cpu_{request}$, $memory_{request}$, $storetype_{request}$, $storesize_{request}$) and determines whether the user has sufficient quota based on the user's information ID, i.e., $memory_{quota} > memory_{request}$, $cpu_{quota} > cpu_{request}$, $storetype_{quota} = storetype_{request}$, $storesize_{quota} > storesize_{request}$, if the condition is satisfied, then proceeds to the next step, if not, then returns the insufficient user quota information.

Step S230: filtering out a plurality of storage platforms meeting a storage demand based on the storage demand of the user. The data centers corresponding to the plurality of storage platforms meeting the storage demand are called a target group data center.

The storage demand refers to the demand for storage space created by storage users. The storage demand may include storage capacity and storage type. For example, if the user creates a storage capacity of 10 GB and a data type of storetype, the storage demand is that storage type is storetype and storage capacity is 10 GB.

The storage platform that meets the storage demand refers to the storage platform whose storage type meets the user's request and whose storage capacity is greater than the user's storage demand. In some embodiments, the storage demand may include the storage platform having a storage capacity greater than a data amount of production data. For more about production data can be found in FIG. 1 and its related description.

In some embodiments, the computing power network service platform may filter out, based on the storage demand of the user, from a plurality of storage platforms with the same storage type, a number of storage platforms with storage capacity greater than or equal to the storage demand as the storage platforms that meet the storage demand.

In some embodiments, the computing power network service platform may also filter out, based on the storage demand of the user, from a plurality of storage platforms with a storage capacity greater than or equal to the storage demand, a number of storage platforms whose storage type meets the request of the user as the storage platforms that meet the storage demand.

Exemplarily, the computing power network service platform queries the required storage type of the computational data as $storetype_{request}$ and the computational data size as $storesize_{request}$ based on the unique identifier of the computation data as $ID_{data}$, and filters out the storage platform that matches the computational data as $Sa=\{S_{a1}, S_{a2}, \ldots, S_{an}\}$ based on $storetype = storetype_{request}$, $storesize_{surpus} > storesize_{request}$, and the data center where the storage platform is located is $Da=\{D_{a1}, D_{a2}, \ldots, D_{an}\}$. For more about storage platforms can be found in FIG. 1 and its related description.

Step S240: determining whether the target group data center has at least one computing power platform meeting the computing power demand of the user.

The computing power demand refers to the resource demand proposed by the user. For example, the computing power demand may include calculating the size of the required memory and the number of CPUs proposed by the user.

In some embodiments, the computing power network service platform determines whether the target group data center has the computing power platforms meeting the computing power demand of the user, including: in response to a determination that a remaining memory size of the computing power platform is greater than a memory size of the computing power demand of the user, and a number of remaining CPUs of the computing power platform is greater than a number of CPUs of the computing power demand of the user, indicating that the target group data center has the at least one computing power platform meeting the computing power demand of the user; otherwise, indicating that the target group data center does not have a computing power platform meeting the computing power demand of the user.

Step S250-1: in response to a determination that the target group data center has the at least one computing power platform meeting the computing power demand, outputting number of data center corresponding to the at least one computing power platform.

Step S250-2: in response to a determination that the target group data center does not have the at least one computing power platform meeting the computing power demand, filtering out at least one computing power platform meeting the computing power demand from a non-target group data center based on the computing power demand.

The non-target group data center refers to the remaining data centers in all data centers except for the target-group data center.

It should be understood that the global scheduling system of the computing power network service platform contains a filtering layer and a decision-making layer. The filtering layer may filter out all the suitable computing power platforms $C_a = \{C_{a1}, C_{a2}, \ldots, C_{an}\}$ in other data centers, i.e., the computing power platforms satisfying a condition of $memory_{surplus} > memory_{request}$ and $cpu_{surplus} > cpu_{request}$. If none suitable computing power platform is filtered out, it means that there is no suitable computing power platform in the current computing power network system; and if the suitable computing power platform is filtered out, the filtering layer returns all the suitable computing power platforms $C_a = \{C_{a1}, C_{a2}, \ldots, C_{an}\}$ with the corresponding located data centers $D_a = \{D_{a1}, D_{a2}, \ldots, D_{an}\}$. For more about computing power platforms can be found in FIG. 1 and its related description.

Step S260: combining the filtered storage platforms and at least one filtered computing power platform that do not belong to a same data center one by one to obtain a plurality of combinations of the storage platforms and the computing power platforms; and calculating numerical values of different network performance indicators between the storage platforms and the computing power platforms for each combination of the plurality of combinations.

Network performance indicators are for measuring network performance. The numerical values of network performance indicators may be called network performance data. In some embodiments, the different network performance indicators include a network bandwidth, a network delay, a network jitter, and a network packet loss rate between the storage platform and the computing power platform.

In some embodiments, the computing power network service platform may obtain network performance indicators by a network performance assessment tool. For example, the computing power network service platform may obtain the network delay, the network jitter, and the network packet loss rate, etc. through testing via a network performance assessment tool Iperf.

Exemplarily, the filtering layer filters out combinations of storage platforms and computing power platforms that do not belong to the same data center. These filtered combinations are sent to the decision-making layer of the global scheduling system of the computing power network service platform for further processing and decision-making.

In some embodiments, the computing power network service platform calculates numerical values of different network performance indicators for each combination of the plurality of combinations, includes following steps.

Step S260-1: periodically computing a network bandwidth $B = \{B_1, B_2, \ldots, B_n\}$, a network delay $L = \{L_1, L_2, \ldots, L_n\}$, a network jitter $J = \{J_1, J_2, \ldots, J_n\}$, and a network packet loss rate $P = \{P_1, P_2, \ldots, P_n\}$ data between the computing power platform $Ca = \{C_{a1}, C_{a2}, \ldots, C_{an}\}$ and the storage platform $S_a = \{S_{a1}, S_{a2}, \ldots, S_{an}\}$ that do not belong to the same data center, and measuring data multiple times between the computing power platform $C_a = \{C_{a1}, C_{a2}, \ldots, C_{an}\}$ and the storage platform $S_a = \{S_{a1}, S_{a2}, \ldots, S_{an}\}$.

Step S260-2: pre-processing the acquired network performance data by the truncated mean algorithm, including: firstly, sorting the data in descending order; secondly, removing maxima and minima whose data amount is 2% of the total data amount, respectively; finally, calculating the average of the remaining data as the final network performance data; and writing the final network performance data re into the database of the computing power network service platform.

TABLE 1

| | | Network performance data | | | |
|---|---|---|---|---|---|
| Storage platform | Computing power platform | Bandwidth (Mbps) | Delay (ms) | Jitter (ms) | Packet loss rate (%) |
| $S_1$ | $C_5$ | 750 | 10 | 2 | 0.5 |
| $S_1$ | $C_5$ | 400 | 15 | 3 | 1.2 |
| $S_2$ | $C_6$ | 1000 | 8 | 1 | 0.3 |
| $S_2$ | $C_6$ | 800 | 12 | 2.5 | 1.8 |

It should be appreciated that the data set forth in Table 1 is provided as an example only and does not constitute a limitation on the embodiments of the present disclosure.

Step S270: determining the optimal combination of the storage platform and the computing power platform based on the numerical values of the different network performance indicators between the storage platforms and the computing power platforms for each combination of the plurality of combinations.

The optimal combination of the storage platform and the computing power platform is the optimal combination that meets the user demand. In some embodiments, the user demand includes at least one of location priority, network priority, capacity priority, and low price priority.

In some embodiments, the computing power network service platform may determine the optimal combination of the storage platform and the computing power platform by a variety of methods.

In some embodiments, the computing power network service platform determines the optimal combination of the storage platform and the computing power platform based on the numerical values of the different network performance indicators between the storage platforms and the computing power platforms for each combination of the plurality of combination, including: constructing, by the computing power network service platform, the multi-objective optimization function under the storage-computing separation scenario based on the numerical values of the different network performance indicators, subjective weight vectors of the different network performance indicators, objective weight vectors of the different network performance indicators between the storage platforms and the computing power platforms for each combination, and a resource demand of the user, and solving the multi-objective optimization function to obtain the optimal combination of the storage platform and the computing power platform that meets the user demand.

In some embodiments, the subjective weight vectors of the different network performance indicators are calculated according to a subjective weight decision algorithm.

The subjective weight vectors of different network performance indicators are calculated by a process, including:

Step S270-11: constructing a hierarchical structure for AHP, including: clarifying the goals and criteria of the decision problem and organizing the goals and criteria into the hierarchical structure with two levels, the first level being to select the storage platforms and the computing power platforms, and the second level being the network quality indicators including a bandwidth, a delay, a jitter, and a packet loss rate.

Step S270-12: comparing the relative importance between indicators, including: for each pair of criteria in the hierarchical structure, performing a two-by-two comparison to determine the relative importance of the criteria between two; using a scale of 1-9, where 1 denotes the same importance, 3 denotes a slight importance difference, 5 denotes a moderate importance difference, 7 denotes a strong importance difference, and 9 denotes an extreme importance difference; and filling in the comparison matrix based on expert judgment or expert experience.

TABLE 2

Expert experience

| Bandwidth (B) | Delay (D) | Jitter (J) | Packet loss rate (P) |
|---|---|---|---|
| B/B = 1 | B/D = 5 | B/J = 3 | B/P = 2 |
| D/B = 1/5 | D/D = 1 | D/J = 13 | D/P = 1/2 |
| J/B = 1/3 | J/D = 3 | J/J = 1 | J/P = 1/2 |
| P/B = 1/2 | P/D = 2 | P/J = 2 | P/P = 1 |

It should be appreciated that the data set forth in Table 2 is provided as an example only and does not constitute a limitation on the embodiments of the present disclosure.

Step S270-13: constructing the comparison matrix, including: constructing the comparison matrix A, where $a_{ij}$ denotes the importance of criterion i with respect to criterion j; the comparison matrix for j network quality indicators is represented as:

$$A = \begin{pmatrix} 1 & a_{12} & \cdots & a_{1j} \\ 1/a_{12} & 1 & \cdots & a_{2j} \\ \vdots & \vdots & \ddots & \vdots \\ 1/a_{1j} & 1/a_{2j} & \cdots & 1 \end{pmatrix}. \quad (1)$$

Step S270-14: normalizing the comparison matrix to ensure that sums of each column equal to 1, including:

Firstly, for each column, calculating the sum of the elements in the column.

$$\text{Column Sum} = [\text{Column Sum1, Column Sum2, } \ldots, \text{Column } Sumk] \quad (2)$$

$$= [1 + 1/a12 + \ldots + 1/a1j, a12 + 1 + \ldots + 1/a2j, \ldots,$$

$$a1j + a2j + \ldots + 1]$$

obtaining the normalized comparison matrix by dividing each element by the sum of the corresponding column.

$$A' = \quad (3)$$

$$\begin{pmatrix} 1/\text{Column Sum1} & a_{12}/\text{Column Sum2} & \cdots & a_{1j}/\text{Column } Sumk \\ 1/a_{12}/\text{Column Sum1} & 1/\text{Column Sum2} & \cdots & a_{2j}/\text{Column } Sumk \\ \vdots & \vdots & \ddots & \vdots \\ 1/a_{1j}/\text{Column Sum1} & 1/a_{2j}/\text{Column Sum2} & \cdots & 1/\text{Column } Sumk \end{pmatrix}$$

Step S270-15: calculating the weight vector, including: calculating the average of each row in the normalized comparison matrix to obtain the subjective weight vector $V_j=(V_1, V_2, V_3, V_4)$.

Step S270-16: calculating the Consistency Ratio (CR) to test consistency, including: if the CR is less than 0.1, indicating that the judgment matrix has reasonable consistency.

In some embodiments, the objective weight vectors of the different network performance indicators are obtained by calculating.

In some embodiments, the objective weight vectors of different network performance indicators are calculated based on the entropy method.

The objective weight vectors of different network performance indicators are calculated by a process, including:

Step S270-21: standardizing data, including: firstly, standardizing the raw data in order to unify the range of values of different indicators, and mapping each indicator's value to a range of 0 to 1 using two standardization methods of positive and negative indicators. The standardized formula is represented as follows.

For positive indicators:

$$X'_{ij} = \frac{X_{ij} - X_{minj}}{X_{maxj} - X_{minj}} \quad (4)$$

For negative indicators:

$$X'_{ij} = \frac{X_{maxj} - X_{ij}}{X_{maxj} - X_{minj}} \quad (5)$$

Where $X'_{ij}$ is the standardized value, $X_{ij}$ is the original value, and $X_{maxj}$ and $X_{minj}$ are the maximum and minimum values of the indicator j, respectively.

Step S270-22: computing the probability matrix $p_{ij}$.

$$p_{ij} = \frac{X'_{ij}}{\sum_{i=1}^{n} X'_{ij}} \quad (6)$$

Step S270-23: calculating the entropy value for each performance indicator, and the entropy value Ej is calculated using the following formula.

$$E_j = -\frac{1}{\ln(n)} \sum_{i=1}^{n} p_{ij} \ln(p_{ij}), \; E_j \geq 0 \quad (7)$$

Where $E_j$ is the entropy value of indicator j, n is the number of candidate programs, and $p_{ij}$ is the probability matrix.

Step S270-24: calculating the weights of the indicators, which are calculated using the following formula.

$$W_j = \frac{1 - E_J}{\sum_{j=1}^{m} E_J} \quad (8)$$

Where $W_j$ is the weight of indicator j and m is the number of performance indicators.

Finally, the objective weight vector $W_j = \beta = (\beta_1, \beta_2, \beta_3, \beta_4)^T$ is obtained for each performance indicator.

In some embodiments, the step S270 further comprises follow steps.

Constructing a comprehensive weight decision model by building a least-squares objective function to obtain a comprehensive weight vector formula for the performance indicator.

$$F_j = \lambda V_j + (1 - \lambda) W_j \quad (9)$$

$$F_j = \quad (10)$$
$$(\lambda V_1 + (1-\lambda)W_1, \lambda V_2 + (1-\lambda)W_2, \lambda V_3 + (1-\lambda)W_3, \lambda V_4 + (1-\lambda)W_4,)$$

Where $F_j$ is the comprehensive weight of the jth network performance indicator; $\lambda$ and $I-\lambda$ are weighting factors of subjective and objective preference coefficients, and $0<\lambda<I$; and the computing power network service platform may use a comprehensive weight vector formula to weight the weight vectors.

In some embodiments, the determination of entering a storage-computing separation scenario or a data transfer scenario is based on a comparison result between the network effectiveness threshold H of the computing power network service platform and the true network effectiveness $K_j$ of the computing power network service platform.

When the network effectiveness threshold H of the computing power network service platform is less than the true network effectiveness $K_j$ of the computing power network service platform, it enters the storage-computing separation scenario.

When the network effectiveness threshold H of the computing power network service platform is greater than the true network effectiveness $K_j$, it enters the data transfer scenario.

The network effectiveness is data that characterizes the relative performance of network. For example, the higher the network effectiveness, the better the relative performance of network. In some embodiments, the bandwidth, the delay, the jitter, the packet loss rate, and the time are analyzed statistically to form a normal distribution curve, and a maximum slope in the curve is selected as the network effectiveness threshold H of the computing power network service platform.

In some embodiments, the true network effectiveness $K_j$ is obtained by the following formula.

$$K_j = \frac{(\lambda V_1 + (1-\lambda)W_1) * B_r}{B_{max}} + \frac{(\lambda V_2 + (1-\lambda)W_2) * D_r}{D_{max}} + \quad (11)$$
$$\frac{(\lambda V_3 + (1-\lambda)W_3) * J_r}{J_{max}} + \frac{(\lambda V_4 + (1-\lambda)W_4) * P_r}{P_{max}}$$

Wherein, $B_r$, $D_r$, $J_r$, and $P_r$ are the true values of the network performance indicators of the bandwidth, the delay, the jitter, and the packet loss rate between the current storage platform and the computing power platform, and $B_{max}$, $D_{max}$, $J_{max}$, and $P_{max}$ are the maximum values of the network performance indicators of the bandwidth, the delay, the jitter, and the packet loss rate between the current storage platform and the computing power platform, respectively, as recorded by the computing power network service platform.

In some embodiments, the constructing the multi-objective optimization function under the storage-computing separation scenario and solving the multi-objective optimization function to obtain the optimal combination of the storage platform and the computing power platform that meets the user demand, includes following steps.

Step S270-31: determining whether a user has a single choice or multiple choices from four options including location priority, network priority, capacity priority, and low price priority, in response to a determination that the user has the single choice, entering the step S270-32; or in response to a determination that the user has the multiple choices, entering the step S270-33.

Step S270-32: outputting a corresponding computing power platform and a data center in which the corresponding computing power platform is located according to the user demand using a corresponding minimization function.

Location priority: calculating the Euclidean distance between all target data centers and the data center where the data is located.

$$l_f = \min \sqrt{(x_{target} - x_{storage})^2 + (y_{target} - y_{storage})^2} \quad (12)$$

where $l_f$ denotes the location-prioritized target data center; $x_{target}$ and $y_{target}$ denote the latitude and longitude of the city in which the target data center is located, which is a two-dimensional row vector; $x_{storage}$ and $y_{storage}$ denote the latitude and longitude of the city in which the current storage data node is located, which is a two-dimensional row vector.

Network priority: calculating network performance parameters for all target data centers.

$$i_f = \min \left( \frac{1}{\lambda_1 T_{delay} + \lambda_2 T_{tp} + \lambda_3 T_{lr} + \lambda_4 T_{dv}} \right) \quad (13)$$

where $l_f$ denotes the network-prioritized target data center; a delay $T_{delay}$, a throughput $T_{tp}$, a packet loss rate $T_{lr}$, and a jitter $T_{dv}$ denote the network parameters of the target data center, which is four-dimensional row vector.

Capacity priority: obtaining the remaining GPUs in all the target data centers and selecting a target data center with the largest remaining amount.

$$v_f = \min\left(\frac{1}{GPU_{avaiable}}\right) \quad (14)$$

Where $v_f$ denotes the capacity-prioritized target datacenter, and $GPU_{avaiable}$ denotes the amount of remaining effective GPUs in the target datacenter.

Low price priority: calculating price of all target data center and selecting a target data center with the lowest price.

$$p_f = \min(P_j^{Si} * M + P_j^{Ci} + P_j^{Gi}) \quad (15)$$

where $p_f$ denotes the low price-prioritized target data center, $P_j^{Si}$ denotes the storage unit price of the target data center, $P_j^{Ci}$ denotes the CPU unit price of the target data center, and $P_j^{Gi}$ denotes the GPU unit price of the target data center.

Step S270-33: constructing a multi-objective optimization function according to the user remand and outputting the optimal combination of the storage platform and the computing power platform by randomly selecting one of the location priority, the network priority, the capacity priority, and the low price priority.

Location priority and network priority: combining location and network information to compute a multi-objective optimization function.

$$li_f = \begin{cases} \min\sqrt{(x_{target} - x_{storage})^2 + (y_{target} - y_{storage})^2} \\ \min\left(\frac{1}{\lambda_1 T_{delay} + \lambda_2 T_{tp} + \lambda_3 T_{lr} + \lambda_4 T_{dv}}\right) \end{cases} \quad (16)$$

where $li_f$ denotes the location-prioritized and the network-prioritized target data center; $x_{target}$ and $y_{target}$ denote the latitude and longitude of the city in which the target data center is located, which is a two-dimensional row vector; $x_{storage}$ and $y_{storage}$ denote the latitude and longitude of the city in which the current storage data node is located, which is a two-dimensional row vector; the delay $T_{delay}$, the throughput $T_{tp}$, the packet loss rate $T_{lr}$, and the jitter $T_{dv}$ denote the network parameters of the target data center, which is a four-dimensional row vector.

Location priority and capacity priority: combining location and capacity demands to compute a multi-objective optimization function.

$$lv_f = \begin{cases} \min\sqrt{(x_{target} - x_{storage})^2 + (y_{target} - y_{storage})^2} \\ \min\left(\frac{1}{GPU_{avaiable}}\right) \end{cases} \quad (17)$$

where $lv_f$ denotes the location-prioritized and capacity-prioritized target data center; $x_{target}$ and $y_{target}$ denote the latitude and longitude of the city in which the target data center is located, which is a two-dimensional row vector; $x_{storage}$ and $y_{storage}$ denote the latitude and longitude of the city in which the current storage data node is located, which is a two-dimensional row vector; and $GPU_{available}$ denotes the amount of remaining effective GPUs in the target data center.

Location priority and low price priority: combine the location and low price demands to compute a multi-objective optimization function.

$$lp_f = \begin{cases} \min\sqrt{(x_{target} - x_{storage})^2 + (y_{target} - y_{storage})^2} \\ \min(P_j^{Si} * M + P_j^{Ci} + P_j^{Gi}) \end{cases} \quad (18)$$

where $lp_f$ denotes the location-prioritized and low price-prioritized target data center; $x_{target}$ and $y_{target}$ denote the latitude and longitude of the city in which the target data center is located, which is a two-dimensional row vector; $x_{storage}$ and $y_{storage}$ denote the latitude and longitude of the city in which the current storage data node is located, which is a two-dimensional row vector; $P_j^{Si}$ denotes the storage unit price of the target data center, $P_j^{ci}$ denotes the CPU unit price of the target data center, and $P_j^{Gi}$ denotes the GPU unit price of the target data center.

Network priority and capacity priority: combining network and capacity demands to compute a multi-objective optimization function.

$$iv_f = \begin{cases} \min\left(\frac{1}{\lambda_1 T_{delay} + \lambda_2 T_{tp} + \lambda_3 T_{lr} + \lambda_4 T_{dv}}\right) \\ \min\left(\frac{1}{GPU_{avaiable}}\right) \end{cases} \quad (19)$$

where $iv_f$ denotes the network-prioritized and the capacity-prioritized target data center; the delay $T_{delay}$, the throughput $T_{tp}$, the packet loss rate $T_{lr}$, and the jitter $T_{dv}$ denote the network parameters of the target data center, which is a four-dimensional row vector; $GPU_{available}$ denotes the amount of remaining effective GPUs in the target data center.

Network priority and low price priority: combining network and low price demands to compute a multi-objective optimization function.

$$ip_f = \begin{cases} \min\left(\frac{1}{\lambda_1 T_{delay} + \lambda_2 T_{tp} + \lambda_3 T_{lr} + \lambda_4 T_{dv}}\right) \\ \min(P_j^{Si} * M + P_j^{Ci} + P_j^{Gi}) \end{cases} \quad (20)$$

where $ip_f$ denotes the network-prioritized and the low price-prioritized target data center; the delay $T_{delay}$, the throughput $T_{tp}$, the packet loss rate $T_{lr}$, and the jitter $T_{dv}$ denote the network parameters of the target data center, which is a four-dimensional row vector; $p_f$ denotes the capacity-prioritized target data center, $P_j^{Si}$ denotes the storage unit price of the target data center, $P_j^{Ci}$ denotes the CPU unit price of the target data center, and $P_j^{Gi}$ denotes the GPU unit price of the target data center.

Capacity priority and low price priority: combining capacity and low price demands to compute a multi-objective optimization function.

$$vp_f = \begin{cases} \min\left(\frac{1}{GPU_{avaiable}}\right) \\ \min(P_j^{Si} * M + P_j^{Ci} + P_j^{Gi}) \end{cases} \quad (21)$$

where $vp_f$ denotes the capacity-prioritized and low price-prioritized target data center; and $GPU_{available}$ denotes the amount of remaining effective GPUs in the target data center; $p_f$ denotes the capacity-prioritized target data center, $P_j^{Si}$ denotes the storage unit price of the target data center, $P_j^{Ci}$ denotes the CPU unit price of the target data center, and $P_j^{Gi}$ denotes the GPU unit price of the target data center.

Exemplarily, by calculating a multi-objective optimization function (e.g., location priority and network priority), it is concluded that the storage platform $S_a=S_1$ (belonging to the data center $D_1$) and the computing power platform $C_a=C_5$ (belonging to the data center $D_5$) are most appropriate.

In some embodiments, the constructing the multi-objective optimization function under the storage-computing separation scenario and solving the multi-objective optimization function to obtain the optimal combination of the storage platform and the computing power platform that meets the user demand, includes following steps.

Step S270-41: obtaining the Graphic Processing Units (GPUs) of the data centers where all the computing power platforms are located, sorting the data center in the descending order of the memory, and leaving the data centers that satisfy the user's GPU and memory demands.

Step S270-42: obtaining the available storage capacity of the data centers in which each computing power platform of the step S270-41 is located, sorting the data centers according to in the descending order of the available storage capacity, and leaving the data centers that satisfy the user's storage demand.

Step S270-43: calculating the data transfer time of the data centers where the remaining computing power platforms are located and sorting the computing power platforms in the descending order of the computed data transfer time.

The data transfer time may be obtained by calculating the quotient of the data capacity to be transferred between two adjacent data centers and the bandwidth between the current two data centers.

Step S270-44: calculating the true network effectiveness of each computing power platform based on the sorting of the step S270-43.

Step S270-45: determining whether the true network effectiveness of at least one of the data centers where the computing power platform is located satisfies the user demand, if yes, entering the step S270-46; if no, obtaining the available storage capacity of the data centers where the remaining computing power platforms are located, leaving the data centers that meet the storage demand of the user, randomly selecting a data center as the target data center, and returning ID of the data center.

Step S270-46: determining whether there is more than one data in the target data center, if yes, entering the step S270-47; if no, outputting the unique data center name.

Step S270-47: adding the demands of multiple priority strategies selected by the user to the multi-objective optimization function, solving the multi-objective optimization function to output the optimal combination of the storage platform and the computing power platform.

The multi-objective optimization function (NSGA-III) introduces the concept of evolutionary objective space decomposition, and the basic idea is to transform a multi-objective optimization problem into multiple single-objective optimization sub-problems, and by decomposing the objective space, the problem may be transformed into multiple small scale sub-problems for solving.

In some embodiments, the decision-making layer sends the output result after entering the scenario (e.g., the storage-computing separation scenario or the data transfer scenario) to the job execution system, and the job execution system executes the task based on the output result from the decision-making layer of the global scheduling system.

In some embodiments, the job execution system deploys the user's job and computational data to the corresponding storage platform and computing power platform for execution based on the optimal combination of the storage platform and the computing power platform selected by the global scheduling system. Meanwhile, the job execution system monitors the execution progress and status of the job and provides real-time execution feedback to the user.

Figure 5:
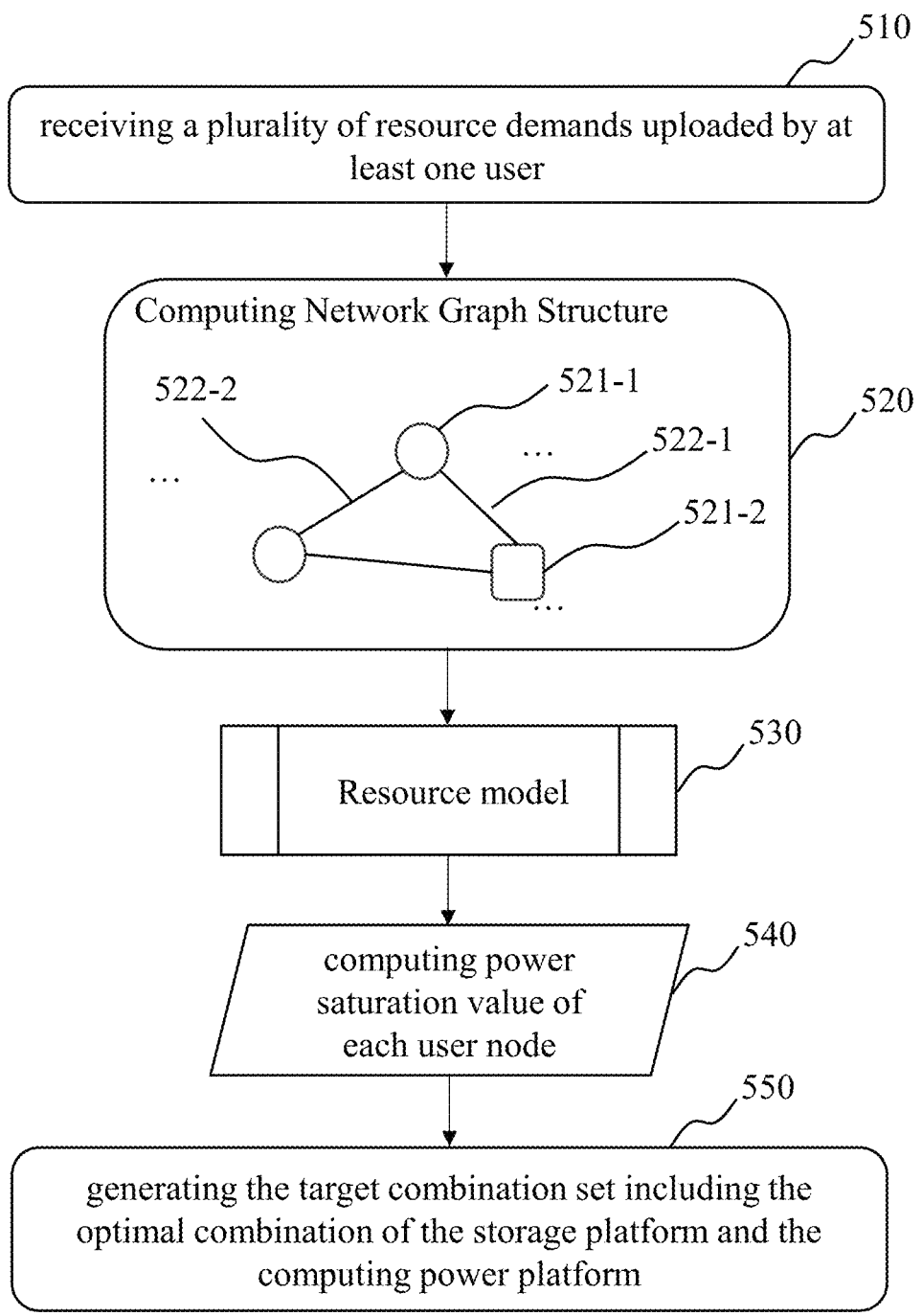
FIG. 5 is a schematic diagram illustrating a process for generating an optimal combination of a storage platform and a computing power platform that satisfies a plurality of resource demands according to some embodiments of the present disclosure.

For more about how to determine the optimal combination of the storage platform and the computing power platform, please see FIG. 5 and related descriptions.

Step S280: deploying the job and computation data of the user to the optimal combination of the storage platform and the computing power platform for storage and computation.

In some embodiments of the present disclosure, pooling and centralized management of computational resources distributed across a wide area network is achieved by determining the optimal combination of the storage platform and the computing power platform through the computing power network service platform. By establishing a unified resource management system, computing resources at different geographic locations and network environments can be effectively managed and scheduled. By comprehensively considering network performance indicators and task requirements, the system can dynamically assign tasks to high-performance computing power platforms and network paths, avoiding the situation where tasks are assigned to poor-performance resources, which effectively reduces task execution time and improves task completion efficiency. Moreover, the system can comprehensively take into account the heterogeneity and performance differences of the computing resources in a wide range, and reasonably allocate tasks to different resources, which makes full use of the computing power, the storage capacity, and the network bandwidth of each computing power platform, improves resource utilization efficiency, and avoids resource waste. At the same time, based on the comprehensive weight decision model, users may set the weighting parameters of different performance indicators, and flexibly select scheduling scenarios based on task requirements and priorities, which enables users to achieve personalized resource scheduling based on specific needs, and to meet the diverse needs of different scenarios. In addition, the system builds a computing power network platform and a computing power service platform to unify the management and collaborative utilization of computing power resources distributed over the wide area, which can provide a highly scalable system architecture that adapts to growing computational demand and different scales of task execution.

Some embodiments of the present disclosure provide an intelligent resource scheduling algorithm, which is capable of dynamically selecting the optimal combination of resources for task scheduling based on user demand and task characteristics, as well as the status and performance indicators of individual computing resources, which can maximize the utilization of computing resources and enhance the efficiency of task execution.

Some embodiments of the present disclosure provide a performance optimization mechanism for wide area networks. By analyzing and evaluating the network performance indicators between different combinations of the storage platforms and computing power platforms, the system can select combinations with low network delay and high bandwidth, thereby reducing communication delay during task execution and improving data transmission efficiency.

Figure 3:
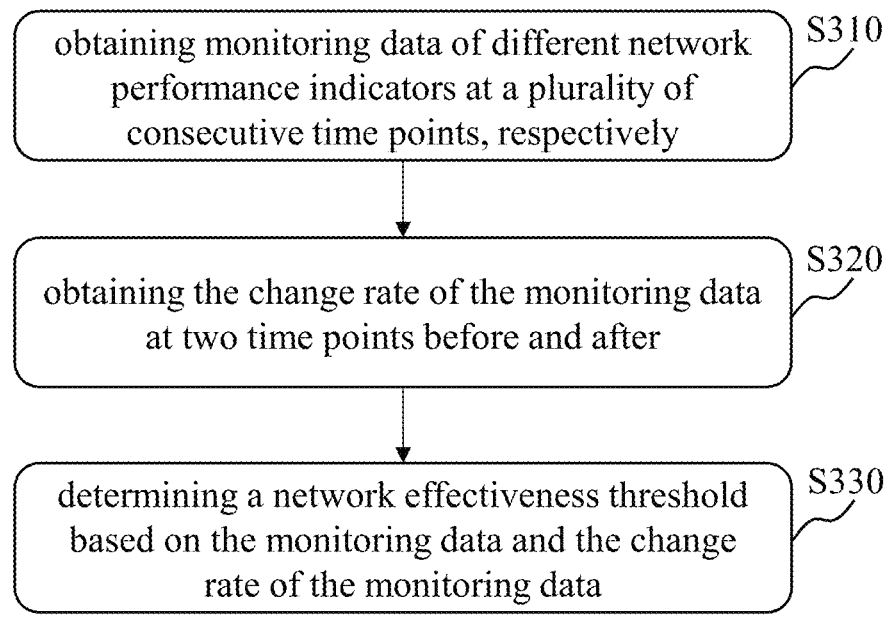
FIG. 3 is an exemplary flowchart illustrating a process for determining a network effectiveness threshold according to some embodiments of the present disclosure.

FIG. 3 is an exemplary flowchart illustrating a process for determining a network effectiveness threshold according to some embodiments of the present disclosure. As shown in FIG. 3, a process 300 may include the following steps. In some embodiments, the process 300 may be performed by a computing power network service platform.

Step S310, obtaining monitoring data of different network performance indicators at a plurality of consecutive time points, respectively.

Consecutive time points are points in chronological order. For example, (10:00, 10:01, 10:02, . . . ) are consecutive time points with a time interval of 1 minute.

The monitoring data refers to the values of the network performance indicators that are actually monitored by the computing power network service platform. For example, the monitoring data may include values of the network performance indicators (e.g., a bandwidth, a delay, a jitter, a packet loss rate, etc.) for the communication lines between different storage platforms and computing power platforms at different time points.

In some embodiments, the computing power network service platform may obtain the monitoring data of the different network performance indicators at a plurality of consecutive time points via a network performance assessment tool or a network monitoring component. For example, the computing power network service platform may obtain the monitoring data for the network bandwidth, the delay, the jitter, and the packet loss rate at a plurality of consecutive time points by testing at a preset frequency via the network performance assessment tool Iperf. The preset frequency may be set manually in advance.

Step S320, obtaining the change rate of the monitoring data at two time points before and after.

The time two points before and after are two adjacent time points among multiple consecutive time points. For example, among the multiple consecutive time points (10: 00:00, 10:00:10, 10:00:20, . . . ), 10:00:00 and 10:00:10 are the two time points before and after.

In some embodiments, the computing power network service platform may monitor, based on the network monitoring component, a bandwidth, a delay, a jitter, and a packet loss rate for a communication line between the storage platform and the computing power platform at consecutive time points, and respectively calculate the bandwidth, delay, jitter, and packet loss rate at each set of two time points before and after, respectively, and generate a change rate of the monitoring data. For example, if a bandwidth 1 at 10:00:00 is 300 Mbps, a bandwidth 2 at the subsequent time point 10:00:10 adjacent to 10:00:00 is 500 Mbps, and a bandwidth at the subsequent time point 10:00:20 adjacent to 10:00:10 is 600 Mbps, then the change rate of the monitoring data for the first set of two time points before and after =(500-300) Mbps/10s=20 Mbps/s, and the change rate of the monitoring data for the second set of two time points before and after =(600-500) Mbps/10 s=5 Mbps/s.

Step S330, determining the network effectiveness threshold based on the monitoring data and the change rate of the monitoring data. For more about the network effectiveness threshold, please see FIG. 2 and its related description.

In some embodiments, the computing power network service platform may determine a network effectiveness threshold based on the monitoring data and the change rate of the monitoring data by a variety of methods.

For example, the computing power network service platform may determine a network effectiveness threshold by following steps.

Step S330-1: determining the maximum of change rate of the monitoring data between the storage platform and the computing power platform by comparing based on the monitoring data and the change rate of the monitoring data.

Step S330-2: generating the network effectiveness threshold between the storage platform and the computing power platform through a weighted calculation based on the maximum of the change rate of the monitoring data between the storage platform and the computing power platform, the weight of the weighted calculation being related to the subjective weight vector. For more about the subjective weight vector, please see FIG. 2 and related description.

For example, the network effectiveness threshold between the storage platform and the computing power platform may be generated by the following formula.

$$H = V_1 * dB_{max} + V_2 * dDm_{ax} + V_3 * dJ_{max} + V_4 * dP_{max} \qquad (22)$$

Where H is the network effectiveness threshold; $dB_{max}$, $dD_{max}$, $dJ_{max}$, and $dP_{max}$ denote the maximum of the change rate of the monitoring data of the bandwidth, the delay, the jitter, and the packet loss rate, respectively. $V_1$, $V_2$, $V_3$, and $V_4$ denote subjective weight vectors corresponding to the bandwidth, the delay, the jitter, and the packet loss rate, respectively.

Step S330-3: based on the network effectiveness thresholds of all combinations of the storage platforms and the computing power platforms generated by the step S330-2, determining the average of the network effectiveness thresholds of all combinations of the storage platforms and the computing power platforms as a network effectiveness threshold of the computing power network service platform.

In some embodiments of the present disclosure, by counting the change rate of the monitoring data of all the combinations of the storage platforms and the computing power platforms, and then it is possible to dynamically generate a more reasonable network effectiveness threshold that conforms to the current actual situation based on the change rate of the monitoring data, and it can reasonably determine whether to subsequently enter the storage-computing separation scenario or the data transfer scenario.

Figure 4:
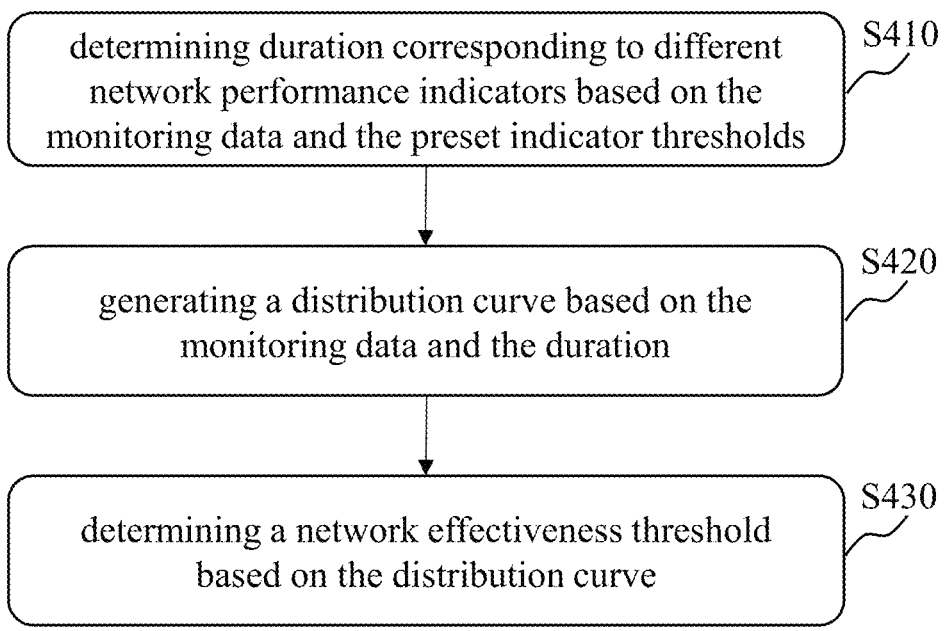
FIG. 4 is another exemplary flowchart illustrating a process for determining a network effectiveness threshold according to some embodiments of the present disclosure.

FIG. 4 is another exemplary flowchart illustrating a process for determining a network effectiveness threshold according to some embodiments of the present disclosure. As shown in FIG. 4, a process 400 may include the following steps. In some embodiments, the process 400 may be performed by a computing power network service platform.

Step S410, determining a duration corresponding to different network performance indicators based on the monitoring data and the preset indicator thresholds. For more about the monitoring data and network performance indicators, please see the relevant descriptions in the previous sections (e.g., FIGS. 2 and 3).

The preset indicator thresholds are numerical value of discriminatory condition related to network performance indicators. For example, the preset indicator thresholds may include at least one of a bandwidth greater than or equal to 300 Mbps, a delay of less than 20 ms, a jitter of less than 3 ms, a packet loss rate of less than 8%, or the like.

According to some embodiments of the present disclosure, the preset indicator thresholds may include a plurality of different segments, each of which has a different value range. Taking bandwidth only as an example, the preset indicator thresholds may include the bandwidth of 0 to 300 Mbps, 300 Mbps to 500 Mbps, 500 Mbps to 800 Mbps, or the like.

In some embodiments, the computing power network service platform may generate preset indicator thresholds through a variety of methods (e.g., statistical analysis, predetermined algorithms, etc.).

For example, the computing power network service platform may generate a preset indicator threshold based on the probability of the computing power network scheduling service result satisfies the user demand. For example, the computing power network service platform may divide the value range of the network performance indicator into a segment when the probability of satisfying the user demand is 100%; divide the range of values of the network performance indicator into a segment when the probability of satisfying the user demand is between 90% and 100%; etc.

In some embodiments, the probability of satisfying the user demand may include the probability of whether satisfy the user demand (e.g., computation demand, timeliness demand, etc.) by scheduling the data stored in the storage platform of the data center 1 to the computing power platform of the data center 2 for computation under the different network performance indicators. For example, when the bandwidth is in the range of 300 Mbps to 400 Mbps, the probability of satisfying the user demand is 80% if 8 network scheduling services can satisfy the user demand among 10 network scheduling services.

Duration is the total time when the values of the network performance indicator are continuously in a value range of a segment. For example, the duration may include the time of 300 hours when the bandwidth is in the range of 300 Mbps to 400 Mbps.

In some embodiments, the computing power network service platform may determine the duration through a variety of methods (e.g., statistical analysis, calculations, etc.). For example, the computing power network service platform may determine the duration by following steps.

Step S410-1: determining different segments of the monitoring data based on the preset indicator thresholds.

Taking the bandwidth only as an example, the preset indicator thresholds of the bandwidth are (300, 400, 500, . . . ), then the bandwidth may be divided into multiple segments such as 300 Mbps to 400 Mbps, 400 Mbps to 500 Mbps, 500 Mbps to 600 Mbps, or the like.

Step S410-2: determining different segments of the monitoring data during the time periods corresponding to the time points based on the monitoring data at multiple consecutive time points.

Taking the bandwidth as an example, if the bandwidth at the time point 1 and the adjacent time point 2 are both 350 Mbps, then the bandwidth is considered to be in the segment of 300 Mbps to 400 Mbps during the time period from the time point 1 to the time point 2.

Step S410-3: determining a sum of the duration of time period within each segment of the monitoring data as the duration corresponding to the different network performance indicators.

Step S420, generating a distribution curve based on the monitoring data and the duration.

A distribution curve is a curve that characterizes the distribution of durations corresponding to the values of the different network performance indicators.

In some embodiments, the computing power network service platform may separately create, based on the durations corresponding to the different network performance indicators, a data collection containing durations within different segment of different monitoring data (e.g., the bandwidth, the delay, the jitter, the packet loss rate, etc.); then, use the segments of the network performance indicators as the horizontal coordinate and the durations as the vertical coordinate, and generate one or more distribution curves based on the dataset of the monitoring data.

For example, if the frequency of the monitoring data obtained from statistics that is very large or very small is low, and the frequency of the monitoring data that is neither particularly large nor particularly small is high, the distribution curve may be a normal distribution curve.

Step S430, determining a network effectiveness threshold based on the distribution curve. For more about the network effectiveness threshold, please see the relevant descriptions of the previous sections (e.g., FIGS. 2-3).

In some embodiments, the computing power network service platform may determine the network effectiveness threshold based on the distribution curve through various methods.

For example, the computing power network service platform may obtain the maximum slopes of multiple distribution curves separately and generate a network effectiveness threshold based on these maximum slopes.

For example, the computing power network service platform may generate a network effectiveness threshold via a predetermined formula. Exemplary predetermined formula is as follows.

$$H = V_1 * B_{max} + V_2 * D_{max} + V_3 * J_{max} + V_4 * P_{max} \qquad (23)$$

Where H is the network effectiveness threshold; $B_{max}$, $D_{max}$, $J_{max}$, and $P_{max}$ denote the maximum slopes of the distribution curves of the bandwidth, the delay, the jitter, and the packet loss rate, respectively. $V_1$, $V_2$, $V_3$, and $V_4$ denote the subjective weight vectors corresponding to the bandwidth, the delay, the jitter, and the packet loss rate, respectively. For more description about the subjective weight vectors, please see FIG. 2 and related descriptions.

In some embodiments of the present disclosure, by reasonably determining preset indicator thresholds, the computing power network service platform may statistically calculate the durations corresponding to the segments of the different network performance indicators, thereby determining more accurate distribution data of the network performance indicators, which ensures the reliability of the generated network effectiveness threshold.

It should be noted that the foregoing descriptions of processes 200, 300, and 400 are for exemplification and illustration purposes only and do not limit the scope of the present disclosure. For a person skilled in the art, various corrections and changes may be made to processes 200, 300, and 400 under the guidance of this disclosure. However, these corrections and changes remain within the scope of the present disclosure.

FIG. 5 is a schematic diagram illustrating a process for generating an optimal combination of a storage platform and a computing power platform that satisfy a plurality of resource demands according to some embodiments of the present disclosure.

In some embodiments, the computing power network service platform may receive a plurality of resource demands uploaded by at least one user; and generate a target combination set meets the plurality of resource demands based on the plurality of the resource demands and the different network performance indicators between the storage platform and the computing power platform. The target combination set comprises a plurality of target combinations, each of the target combinations comprising a storage platform and a computing power platform.

The target combination set includes multiple combinations of the storage platforms and the computing power platforms that satisfy multiple resource demands, respectively. For example, the target combination set (a resource demand 1, a combination 1; a resource demand 2, a combination 2; . . . ; a resource demand N, a combination N) may denote that in the target combination set, the combination 1 of a storage platform 1 and a computing power platform 4 is used to satisfy the resource demand 1, the combination 2 of a storage platform 5 and a computing power platform 1 is used to satisfy the resource demand 2, the combination N of a storage platform 4 and a computing power platform N is used to satisfy the resource demand N, etc.

In some embodiments, the target combination set may include one or more optimal combinations of the storage platforms and the computing power platforms. For more about the optimal combination of the storage platform and the computing power platform, please see FIG. 2 and related descriptions.

In some embodiments, the computing power network service platform may generate the target combination set through a variety of methods (e.g., statistical analysis, generalization, etc.). For example, the computing power network service platform may sort the resource demands in order of the upload time of the resource demands, and then generate the optimal combinations of the storage platforms and the computing power platforms in order, thereby obtaining the target combination set that satisfy multiple resource demands. For more about how to generate the optimal combinations of the storage platforms and the computing power platforms, please see FIG. 2 and related descriptions.

In some embodiments, the computing power network service platform may generate a target combination set by following steps.

Step 5-1: establishing a computing power network graph structure.

In some embodiments, as shown in FIG. 5, the computing power network service platform may establish the computing power network graph structure 520 based on the plurality of received resource demands uploaded by at least one user 510. For example, the computing power network service platform may generate a user node 521-1 based on the user; and a data center node 521-2 based on the data center in the computing power network. The attribute of the user node includes at least one or more resource demands; and the attribute of the data center node includes at least a storage capacity of the storage platform, a storage type, and a number of CPUs of the computing power platform.

It should be understood that a user that does not upload resource demands currently may not be set as a user node by the computing power network service platform.

In some embodiments, the attribute of the data center node may also include whether the platform is activated. Whether the platform is activated indicates whether the storage platforms and/or the computing power platforms of the data center are used for computing to meet the resource demands. For example, the storage platform being activated indicates that the storage platform of the data center is used for computing to meet the resource demand.

In some embodiments, the computing power network service platform may construct a first virtual edge 522-1 between the user node and the data center node. Attribute of the first virtual edge 522-1 includes a geographic distance between the user node and the data center node and the resource demand which the data center is used to meet. For example, the attribute of the first virtual edge (A3-s8, 30, 3) may represent that the first virtual edge connects a user node A3 and the data center node s8 with a geographic distance of 30 km, and the data center is configured to satisfy the resource demand 3 of the user node. For more about how to determine the geographic distance, please see FIG. 2 and related descriptions.

In some embodiments, the computing power network service platform may construct a second virtual edge 522-2 between different data center nodes. The attribute of the second virtual edge includes at least network performance indicators (e.g., the bandwidth, the delay, the jitter, the packet loss rate, etc.).

In some embodiments, the computing power network service platform may generate the computing power network graph structure 520 based on a large number of user nodes 521-1, data center nodes 521-2, first virtual edges 522-1, and second virtual edges 522-2.

In some embodiments, the computing power network service platform may randomly generate a computing power network graph structure. For example, the computing power network service platform may randomly connect one or more data center nodes for one or more user nodes, which is represented as using the data center nodes to meet the one or more resource demands of the one or more users. The resource demand corresponds to a combination of a storage platform and a computing power platform, the storage platform and the computing power platform may be located at the same data center node or different data center nodes.

In some embodiments, the computing power network service platform delete a computing power network graph structure corresponding to the monitoring data higher than the preset indicator thresholds (e.g., a preset delay threshold, a preset packet loss rate threshold, etc.) based on the monitoring data (e.g., the bandwidth, the delay, jitter, the packet loss rate, etc.) on the network performance indicators between the two data center nodes.

In some embodiments, the computing power network service platform may grade the resource demands in terms of importance and generate a plurality of candidate graph structures based on the grading results as well as the monitoring data of the network performance indicators. For example, the computing power network service platform may determine the importance of the resource demands uploaded by different users based on the importance of the different users; and then, allocate, based on the importance of the resource demands, combinations of the storage platforms and the computing power platforms corresponding to different resource demands in descending order, and further generate multiple candidate graph structures. The importance of the different users is preset by the user. The above embodiments can improve computational efficiency, avoid randomly generating a large number of useless graph structures, and reduce the amount of computation.

Step 5-2: processing the computing power network graph structure based on a resource model.

In some embodiments, as shown in FIG. 5, the computing power network service platform inputs the candidate graph structure into the resource model 530 to obtain the computing power saturation value of each user node 540 output by the resource model 530.

The resource model 530 may be machine learning models, e.g., Graph Neural Networks (GNN), etc.

The computing power saturation value is a degree to which the combination of the storage platform and the computing power platform meets the resource demand. For example, a computing power saturation value of 1 means that the combination of the storage platform and the computing power platform fully meets the resource demand of the user, and a computing power saturation value of less than 1 means that the combination of the storage platform and the computing power platform does not meet the resource demand of the user.

In some embodiments, the computing power network service platform may obtain the resource model through training based on a large number of graph structure samples with computing power labels.

For example, the computing power network service platform may divide a large number of graph structure samples with the computing power labels into different training sets and perform multiple rounds of iterations; end the iterations when the iteration end condition is satisfied and obtain the resource model. At least one round of iteration in the multiple rounds of iteration comprises: selecting one or more graph structure samples from the training sets, and inputting the one or more graph structure samples into the initial resource model, obtaining the model outputs of the initial resource model corresponding to the one or more graph structure samples; substituting the model outputs of the initial resource model and the corresponding computing power labels into a predefined loss function, calculating a value of the loss function; and based on the value of the loss function, inversely updating the model parameters of the initial resource model. The inversely updating may be realized by various methods, such as gradient descent manner. The iteration end condition may be that the loss function converges, the number of iterations reaches a threshold, etc.

In some embodiments, the computing power network service platform may determine the computing power labels of the graph structure samples based on historical user feedback data. For example, if the computation time for a combination of the storage platform and the computing power platform is less than or equal to a maximum time threshold preset by the user, the computing power saturation value is set to 1.

In some embodiments, the computing power network service platform may divide a large number of graph structure samples with computing power labels into different training sets and apply different learning rates when training with different training sets. For example, the computing power network service platform may divide the randomly generated computing power network graph structures into a training set 1; divide the candidate graph structures generated after deleting some of the computing power network graph structures into a training set 2; and divide the candidate graph structures generated after grading the resource demands according to the importance of the resource demands into a training set 3. The computing power network service platform may set the learning rates of training set 1, training set 2, and training set 3 to be incremented sequentially.

Step 5-3: statistically determining the target combination set.

In some embodiments, as shown in FIG. 5, the computing power network service platform may calculate, based on the computing power saturation value of each user node 540, a sum of the computing power saturation value of the each user node 540 and select the second virtual edge corresponding to the graph structure with the largest computing power saturation value as the optimal combination of the storage platform and the computing power platform in the target combination set, i.e., generating the target combination set including the optimal combination of the storage platform and the computing power platform 550, and executing the tasks and data computation by the job execution system.

In some embodiments of the present disclosure, when multiple resource demands exist simultaneously, the computing power network service platform constructs a realistic computing network computing power network graph structure based on a large number of data centers and users, and then analyzes the computing power network graph structure through a trained resource model, which can quickly obtain a combination of the storage platform and the computing power platform capable of simultaneously meeting the large number of resource demands of users and improve data processing efficiency and user satisfaction.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to this specification. Those types of modifications, improvements, and amendments are suggested in this specification, so those types of modifications, improvements, and amendments remain within the spirit and scope of the exemplary embodiments of this specification.

What is claimed is:

1. A method for computing power network scheduling service based on comprehensive weight decision of network performance, comprising:

filtering out, by a computing power network service platform, a plurality of storage platforms meeting a storage demand of a user based on the storage demand; wherein data centers corresponding to the plurality of storage platforms meeting the storage demand are called a target group data center;

determining, by the computing power network service platform, whether the target group data center has at least one computing power platform meeting a computing power demand of the user, in response to a determination that the target group data center has the at least one computing power platform meeting the computing power demand, outputting number of data center corresponding to the at least one computing power platform; or in response to a determination that the target group data center does not have the at least one computing power platform meeting the computing power demand, filtering out at least one computing power platform meeting the computing power demand from a non-target group data center based on the computing power demand;

combining, by the computing power network service platform, the filtered storage platforms and at least one filtered computing power platform that do not belong to a same data center one by one to obtain a plurality of combinations of the storage platforms and the computing power platforms; and calculating numerical values of different network performance indicators between the storage platforms and the computing power platforms for each combination of the plurality of combinations;

determining, by the computing power network service platform, an optimal combination of a storage platform and a computing power platform based on the numerical values of the different network performance indicators between the storage platforms and the computing power platforms for each combination of the plurality of combinations; deploying job and computational data of the user to the optimal combination of the storage platform and the computing power platform for storage and computation;

wherein the determining, by the computing power network service platform, the optimal combination of the storage platform and the computing power platform based on the numerical values of the different network performance indicators between the storage platforms and the computing power platforms for each combination of the plurality of combination, includes:

constructing, by the computing power network service platform, a multi-objective optimization function under a storage-computing separation scenario based on the numerical values of the different network performance indicators, subjective weight vectors of the different network performance indicators, objective weight vectors of the different network performance indicators between the storage platforms and the computing power platforms for each combination, and a resource demand of the user, and solving the multi-objective optimization function to obtain the optimal combination of the storage platform and the computing power platform that meets an user demand;

wherein entering the storage-computing separation scenario is determined based on a comparison result between a network effectiveness threshold H of the computing power network service platform and a true network effectiveness $K_j$ of the computing power network service platform, including:

when the network effectiveness threshold H is less than the true network effectiveness $K_j$, entering the storage-computing separation scenario, wherein the network effectiveness threshold H is determined by a process including forming a normal distribution curve through performing statistical analysis on a bandwidth, a delay, a jitter, a packet loss rate, and a time, and determining a maximum slope of the normal distribution curve as the network effectiveness threshold H;

the true network effectiveness $K_j$ is determined by a formula:

$$K_j = \frac{(\lambda V_1 + (1-\lambda)W_1) * B_r}{B_{max}} + \frac{(\lambda V_2 + (1-\lambda)W_2) * D_r}{D_{max}} + \frac{(\lambda V_3 + (1-\lambda)W_3) * J_r}{J_{max}} + \frac{(\lambda V_4 + (1-\lambda)W_4) * P_r}{P_{max}}$$

where $B_r$, $D_r$, $J_r$ and $P_r$ are real values of the network performance indicators of the bandwidth, the delay, the jitter, and the packet loss rate between a current storage platform and a current computing power platform, respectively, and $B_{max}$, $D_{max}$, $J_{max}$ and $P_{max}$ are maximum values of the network performance indicators of the bandwidth, the delay, the jitter, and the packet loss rate between the current storage platform and the current computing power platform, respectively, as recorded by the computing power network service platform; and where $\lambda$ and 1-$\lambda$ are weighting factors of subjective and objective preference coefficients, and 0<$\lambda$<1; $W_1$, $W_2$, $W_3$, and We are the objective weight vectors, and $V_1$, $V_2$, $V_3$, and $V_4$ are the subjective weight vectors;

wherein the constructing the multi-objective optimization function under the storage-computing separation scenario, and solving the multi-objective optimization function to obtain the optimal combination of the storage platform and the computing power platform that meets the user demand, includes:

determining whether a user has a single choice or multiple choices from four options including location priority, network priority, capacity priority, and low price priority;

in response to a determination that the user has the single choice, outputting a corresponding computing power platform and a data center in which the corresponding computing power platform is located according to the user demand using a corresponding minimization function; the user demand including one of the location priority, the network priority, the capacity priority, and the low price priority; or in response to a determination that the user has the multiple choices, constructing the multi-objective optimization function according to the user remand, and outputting the optimal combination of the storage platform and the computing power platform by randomly selecting one of the location priority, the network priority, the capacity priority, and the low price priority.

2. The method of claim 1, wherein before the filtering out, by the computing power network service platform, the plurality of the storage platforms meeting the storage demand of the user based on the storage demand, the method further comprises:

receiving, by the computing power network service platform, a resource demand uploaded by the user, and determining whether the user has sufficient quota; in response to a determination that the user has sufficient quota, proceeding to a next step; or in response to a determination that the user does not have sufficient quota, returning insufficient user quota information.

3. The method of claim 2, wherein the determining whether the user has sufficient quota includes:

in response to a determination that a memory quota of the user is greater than a size of a memory requested by the user, a CPU quota of the user is greater than a number of CPUs requested by the user, a type of a user storage quota conforms to a type of a storage quota requested by the user, and a storage size of the user storage quota is greater than a size of computational data requested by the user, indicating that the user has sufficient quota; otherwise, indicating that the user does not have sufficient quota.

4. The method of claim 1, wherein the determining, by the computing power network service platform, whether the target group data center has the computing power platforms meeting the computing power demand of the user, includes:

in response to a determination that a remaining memory size of the computing power platform is greater than a memory size of the computing power demand of the user, and a number of remaining CPUs of the computing power platform is greater than a number of CPUs of the computing power demand of the user, indicating that the target group data center has the computing power platforms meeting the computing power demand of the user; otherwise, indicating that the target group data center does not have a computing power platform meeting the computing power demand of the user.

5. The method of claim 1, wherein the different network performance indicators include a network bandwidth between the storage platforms and the computing power platforms, a network delay between the storage platforms and the computing power platforms, a network jitter between the storage platforms and the computing power platforms, and a network packet loss rate between the storage platforms and the computing power platforms;

the subjective weight vectors of the different network performance indicators are calculated according to a subjective weight decision algorithm; and the objective weight vectors of the different network performance indicators are calculated according to an entropy method.

6. A computing power network scheduling service system based on comprehensive weight decision of network performance using the method of claim 1, comprising: a computing power network service platform, wherein the computing power network service platform is connected to a user and a plurality of data centers, each of the plurality of data centers includes a computing power platform and a storage platform;

wherein the computing power network service platform is configured to:

receive a resource demand uploaded by the user, and determine whether the user has sufficient quota; and in response to a determination that the user has sufficient quota, proceed to a next step; or in response to a determination that the user does not have sufficient quota, return insufficient user quota information;

filter out a plurality of storage platforms meeting a storage demand of the user based on the storage demand of the user; wherein data centers corresponding to the plurality of the storage platforms meeting the storage demand are called a target group data center;

determine whether the target group data center has at least one computing power platform meeting the computing power demand; in response to a determination that the target group data center has the at least one computing power platform meeting the computing power demand, output number of data center corresponding to the at least one computing power platform; or in response to a determination that the target group data center does not have the at least one computing power platform meeting the computing power demand, filter out at least one computing power platform meeting the computing power demand from a non-target group data center based on the computing power demand;

combine the filtered storage platforms and at least one filtered computing power platform that do not belong to a same data center one by one to obtain a plurality of combinations of the storage platforms and the computing power platforms; and calculate numerical values of different network performance indicators for each combination of the plurality of combinations;

determine an optimal combination of a storage platform and a computing power platform that meets a user demand based on the numerical values of the different network performance indicators between the storage platforms and the computing power platforms for each combination of the plurality of combinations;

and deploy job and computational data of the user to the optimal combination of the storage platform and the computing power platform for storage and computation.

* * * * *